(12) United States Patent
Brooks

(10) Patent No.: US 11,039,609 B1
(45) Date of Patent: Jun. 22, 2021

(54) DISPLAY SUPPORT DEVICE

(71) Applicant: Raymond J. Brooks, Pittsford, NY (US)

(72) Inventor: Raymond J. Brooks, Pittsford, NY (US)

( * ) Notice: Subject to any disclaimer, the term of this patent is extended or adjusted under 35 U.S.C. 154(b) by 0 days.

(21) Appl. No.: 17/199,525

(22) Filed: Mar. 12, 2021

(51) Int. Cl.
*A01M 31/06* (2006.01)
*A01M 31/00* (2006.01)
*G03B 17/56* (2021.01)

(52) U.S. Cl.
CPC ......... *A01M 31/006* (2013.01); *G03B 17/561* (2013.01)

(58) Field of Classification Search
USPC .......................................................... 40/124
See application file for complete search history.

(56) References Cited

U.S. PATENT DOCUMENTS

| | | | | |
|---|---|---|---|---|
| 3,304,850 A * | 2/1967 | Gall | ...................... | G03D 13/046 396/634 |
| 3,675,275 A * | 7/1972 | Arblaster | ............... | A44B 99/00 248/75 |
| 6,718,668 B2 * | 4/2004 | Cozzilino | ............... | G09F 11/29 40/604 |
| 7,236,695 B1 * | 6/2007 | Demos | ................... | G03B 15/06 16/241 |
| 7,788,840 B2 * | 9/2010 | Wyant | ................... | A01M 31/06 43/3 |
| 8,168,305 B1 * | 5/2012 | Peterson | ................... | B44C 5/02 428/542.4 |
| 8,323,756 B2 * | 12/2012 | Peterson | ................... | B44C 5/02 428/16 |
| 8,769,860 B2 * | 7/2014 | Bain | ...................... | A01M 31/06 43/2 |
| 8,793,922 B2 * | 8/2014 | Roe | ........................ | A01M 31/06 43/2 |
| 8,858,235 B2 * | 10/2014 | Bain | ......................... | B44C 5/02 434/296 |
| 2010/0115818 A1 * | 5/2010 | Rogers | .................. | A01M 31/06 43/2 |

(Continued)

OTHER PUBLICATIONS 4.5 inch Heavy Duty Spring Clamps and Background Clips, Emart . . . Date Unknown—>>> https://uphoto.com/index.php/product/4-5-inch-heavy-duty-spring-clamps-and-background-clips-emart-heavy-duty-clip-for-muslin-backdrop-photo-studio-photography-backdrop-support-14pcs/.*

(Continued)

*Primary Examiner* — Clayton E. LaBalle
*Assistant Examiner* — Warren K Fenwick
(74) *Attorney, Agent, or Firm* — Tracy Jong Law Firm; Tracy P. Jong; Cheng Ning Jong

(57) ABSTRACT

A display support device for supporting a display of an object, the display support device including: a first elongated member; a second elongated member configured to be removably attached to the first elongated member; and a pair of clamps, a first of which is configured to be removably attached to the first elongated member and a second of which is configured to be removably attached to the second elongated member, wherein the first clamp is configured to secure a first portion of the object, the second clamp is configured to secure a second portion of the object and the first clamp and the second clamp cooperate to support the display of the object.

18 Claims, 7 Drawing Sheets

(56) References Cited

U.S. PATENT DOCUMENTS

| | | | |
|---|---|---|---|
| 2014/0130396 A1* | 5/2014 | Yaron | A01M 31/06 |
| | | | 43/2 |
| 2017/0176125 A1* | 6/2017 | Pauley | F41A 23/04 |
| 2020/0027375 A1* | 1/2020 | Evans | G09F 17/00 |

OTHER PUBLICATIONS

Neewer Photo Studio Heavy Duty Metal Clamp Holder with 5/8" Light Stand Attachment for Reflector—Mar. 13, 2020—>>> https://neewer.com/collections/studio-lighting-backdrop-kit/products/neewer-heavy-duty metal-clamp-holder-10086176.*

* cited by examiner

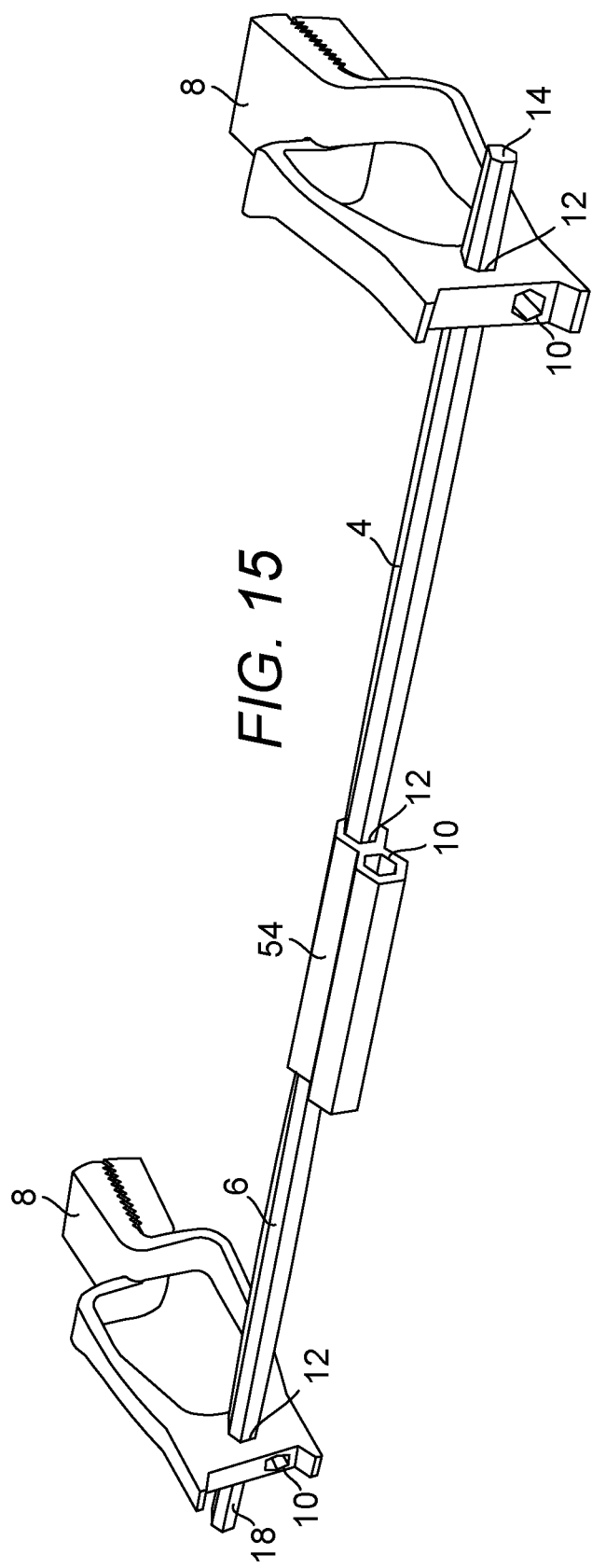

DISPLAY SUPPORT DEVICE

BACKGROUND OF THE INVENTION

1. The Field of the Invention

The present invention relates to a display support device. More specifically, the present invention is directed to a collapsible and compact display support device for securing a turkey's tail in a fan-like display.

2. Background Art

Hunters routinely pose with their kills for photographs to mark successful hunts. A turkey hunter is no different as he or she often poses for photographs next to the animal just harvested. However, in order to make the just-harvested animal appear more interesting in the photographs, the hunter is often required to be within arm's length to reach, prop and spread the turkey tail feathers to simulate a full strut. As the hunter needs to be physically manipulating the tail while getting his or her photographs taken, he or she is limited in his or her pose. It is also possible that the tail feathers will obscure the views of the hunter especially when the hunter does not have a great arm's reach. Attempts have previously been made to provide a device capable of securing a turkey tail for a full strut display.

U.S. Pat. No. 8,323,756 to Peterson (Hereinafter Peterson) discloses a display device for spreading a turkey's tail feathers in a fan-like display. The device consists of an elongated shank having two opposing ends, and two quill clips located one at each of the two opposing ends of the shank having grooves that snap onto the quills near the base of two or more of the turkey's outer tail feathers located to either opposite side of the hub. When installed, the device is invisible to view. An adjustable joint may be provided to enable adjusting a version of the shank having two arms to a certain angle to optimize the turkey fan display. A mounting mechanism may further be provided for mounting an object to the turkey fan display such as the beard, or a pole for use of the fan as a decoy in the field. Peterson's device may be suitable for displaying a turkey's tail upon the removal of the tail from the turkey. A removed tail is more easily manipulated and does not require as much force to erect a tail of a turkey just harvested or one which has not been removed from the animal.

There exists a need for a turkey tail display support device suitable of replacing the use of a hand to spread the tail feathers, freeing the turkey hunter from this chore, leaving him or her free to pose naturally with the harvested turkey, sometimes while holding a weapon. The device is preferably lightweight, compact and takes little effort to assemble or disassemble.

SUMMARY OF THE INVENTION

In accordance with the present invention, there is provided a display support device for supporting a display of an object, the display support device including:
  (a) a first elongated member;
  (b) a second elongated member configured to be removably attached to the first elongated member; and
  (c) a pair of clamps, a first of which is configured to be removably attached to the first elongated member and a second of which is configured to be removably attached to the second elongated member, wherein the first clamp is configured to secure a first portion of the object, the second clamp is configured to secure a second portion of the object and the first clamp and the second clamp cooperate to support the display of the object.

In one embodiment, the second elongated member is configured to be removably attached to the first elongated member for stowage. In one embodiment, at least a clamp of the pair of clamps further includes a stowage receptacle, wherein the stowage receptacle is configured to receive one end of one of the first elongated member and the second elongated member. In one embodiment, the removable attachment between the second elongated member and the first elongated member is a unique peg-unique receptacle attachment. In one embodiment, at least one of the removable attachment between one of the clamps and one of the first elongated member and the removable attachment between the other one of the clamps and the second elongated member is a unique peg-unique receptacle attachment. In one embodiment, at least one of the first clamp and the second clamp is a spring clamp. In one embodiment, the object is a turkey tail.

An object of the present invention is to provide a display support device for a turkey's tail that is still attached to a recently harvested turkey.

Another object of the present invention is to provide a collapsible display support device that can be easily transported.

Another object of the present invention is to provide a compact display support device capable of being placed in a pocket such that its user is likely to have it around when it is needed while on a hunting trip.

Another object of the present invention is to provide a display support device capable to be constructed from a single material rendering a three-dimensional (3D) printing a feasible solution for manufacturing the display support device.

Another object of the present invention is to provide a display support device that can be expediently and securely erected, expediently torn down for stowage and securely stowed as a single unit.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 15 is a top rear view of yet another embodiment of the present display support device, depicting the device having been assembled for use to support a turkey tail to simulate a full strut.

PARTS LIST

2—display support device
4—first elongated member
6—second elongated member
8—clamp
10—stowage receptacle
12—assembly receptacle
14—first end of first elongated member
16—second end of first elongated member
18—first end of second elongated member
20—second end of second elongated member
22—spring element
24—quill
26—jaw
28—clamp opening limiter
30—jaw depth
32—first end of clamp
34—second end of clamp
36—direction in which forces are applied to separate jaws
38—length of display support device while disposed in an in-use or ready condition
40—length of display support device while collapsed
42—width of display support device while disposed in an in-use or ready condition
44—width of display support device while collapsed
46—cross-sectional profile of engaging end of elongated member
48—cross-sectional profile of receptacle of elongated member
50—central axis of first elongated member
52—central axis of second elongated member
54—coupler
56—arm connected to jaw of clamp

PARTICULAR ADVANTAGES OF THE INVENTION

The present display support device is compact, lightweight and intuitive to assemble to form a support device for erecting a turkey tail both while still attached to a turkey or upon being removed from the same animal.

The present display support device is minimalistic as it does not include any moving parts, e.g., a first part that is capable of relative movement with respect to a second part although the parts are reconfigurable to make them capable to be assembled for use or collapsed for stowage.

If desired, the constituents of the support device can be separately stored or transported, e.g., in separate pockets of a user, to further minimize the size of the support device, making it even more convenient to stow or transport the support device.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

A tom's fan includes eighteen feathers. In order to properly spread the feathers, the fan is spread such that the tail feathers on the two outer ends of the fan (first and eighteenth feathers) nearly form a straight line or the fan is nearly a semicircle to simulate a full strut. It is also possible to secure other feathers to provide a presentable simulated partial strut that is aesthetically pleasing.

Figure 1:
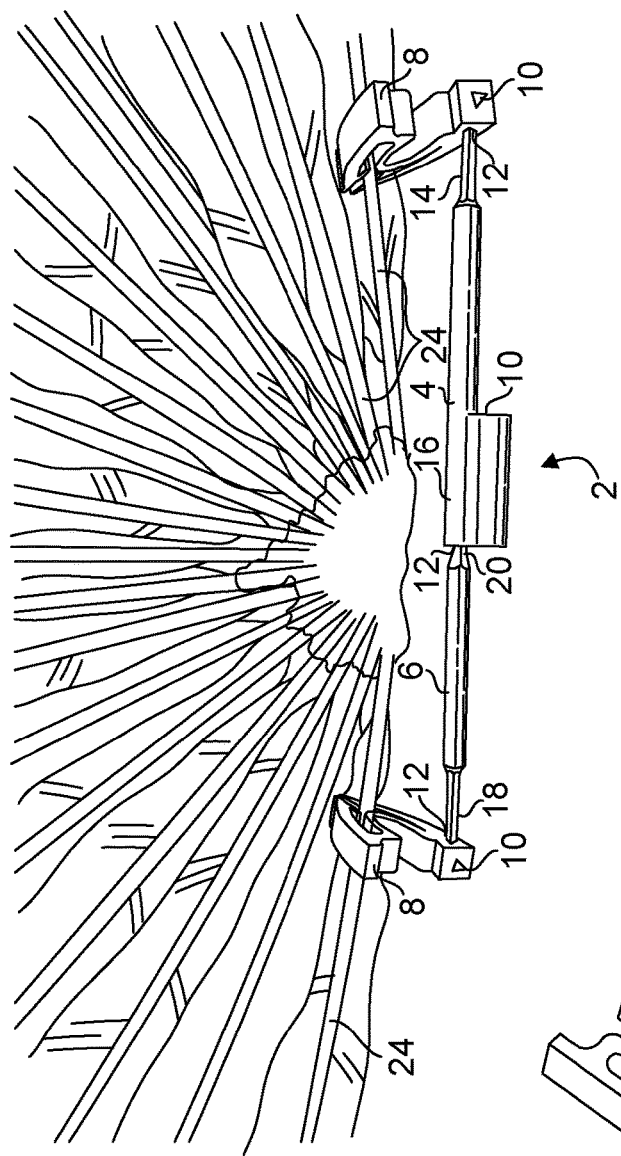
FIG. 1 is a top rear view of a present display support device utilized in supporting a turkey tail to simulate a full strut.
Figure 2:
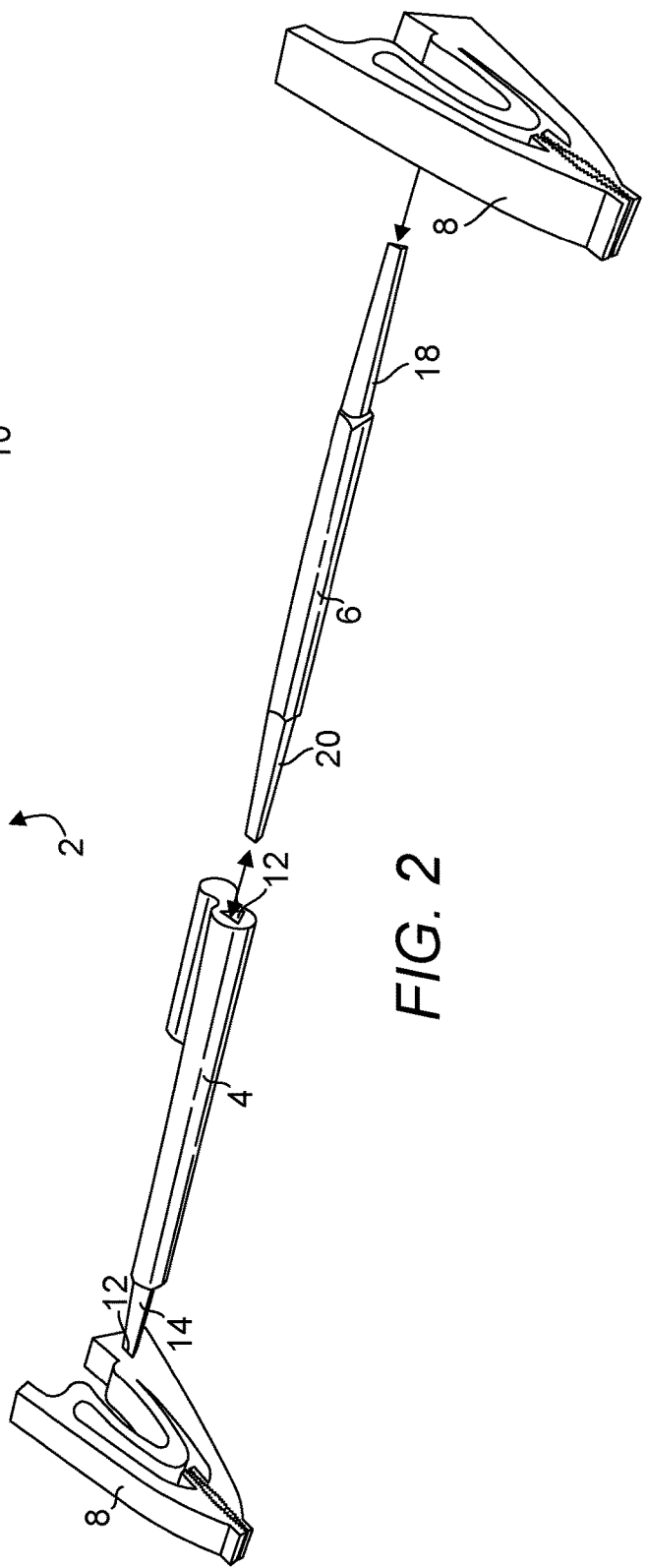
FIG. 2 is a top front view of a present display support device, depicting the device being assembled for use to support a turkey tail to simulate a full strut.

FIG. 1 is a top rear view of a present display support device 2 utilized in supporting a turkey tail to simulate a full strut. FIG. 2 is a top front view of a present display support device, depicting the device being assembled for use to support a turkey tail to simulate a full strut. It shall be noted that, in FIG. 1, the turkey tail is partially shown. The display support device 2 is useful for supporting a display of a turkey tail in full strut, regardless of whether the turkey tail is still part of the animal recently harvested or one which has been removed from the animal. The display support device 2 essentially includes a first elongated member 4, a second elongated member 6 configured to be removably attached to the first elongated member 4 and a pair of clamps 8. A first of the clamps 8 is configured to be removably attached to the first elongated member 4 and a second of the clamps 8 is configured to be removably attached to the second elongated member 6. The first clamp 8 is configured to secure a first portion of the turkey tail, e.g., the first quill 24 and the second clamp 8 is configured to secure a second portion of the turkey tail, e.g., the eighteenth quill 24. The first clamp 8 and the second clamp 8 cooperate to support the display of the turkey tail.

Figure 3:
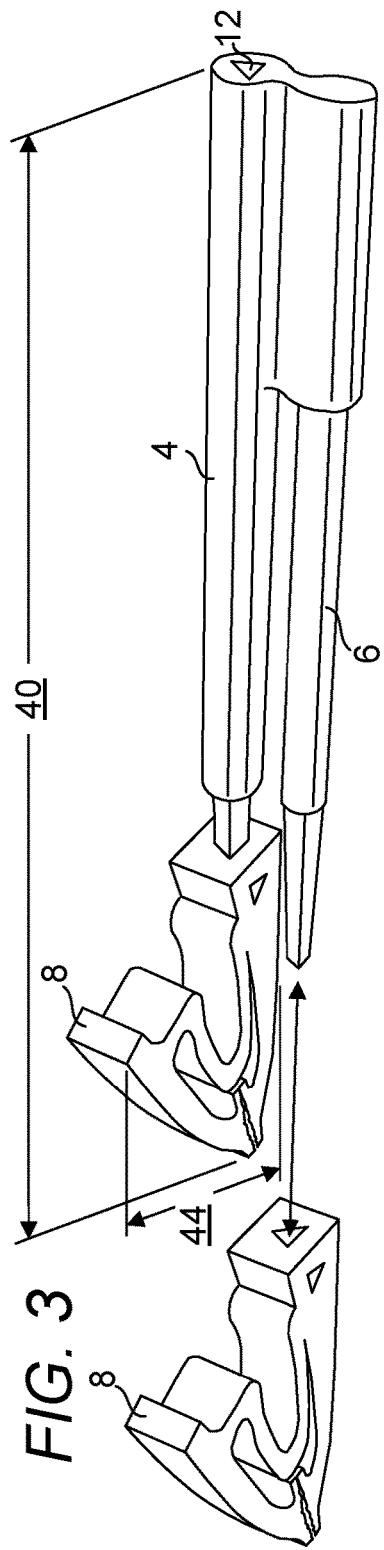
FIG. 3 is a top rear view of a present display support device, depicting the device being collapsed to form a compact package for ease of transport.
Figure 4:
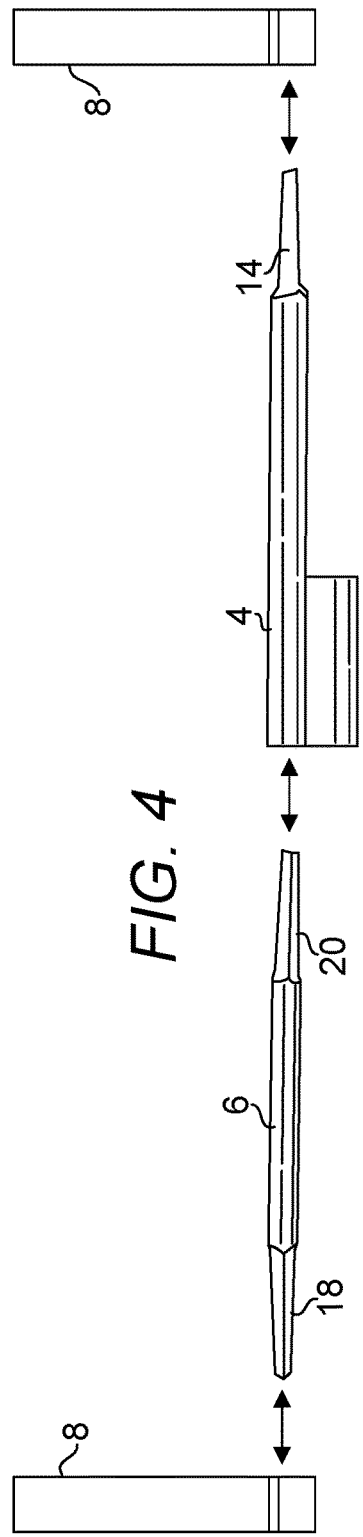
FIG. 4 is a top view of a present display support device, depicting the device being assembled for use to support a turkey tail to simulate a full strut.
Figure 5:
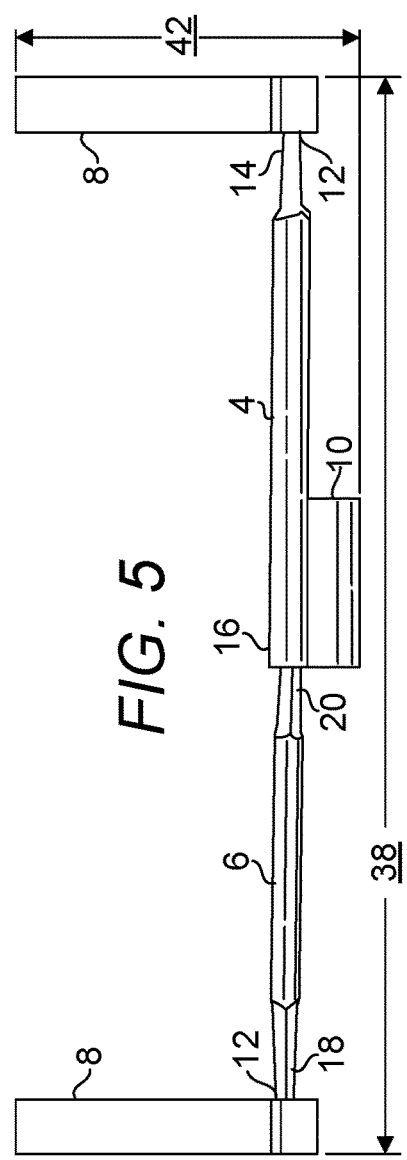
FIG. 5 is a top view of a present display support device, depicting the device having been assembled for use to support a turkey tail to simulate a full strut.
Figure 6:
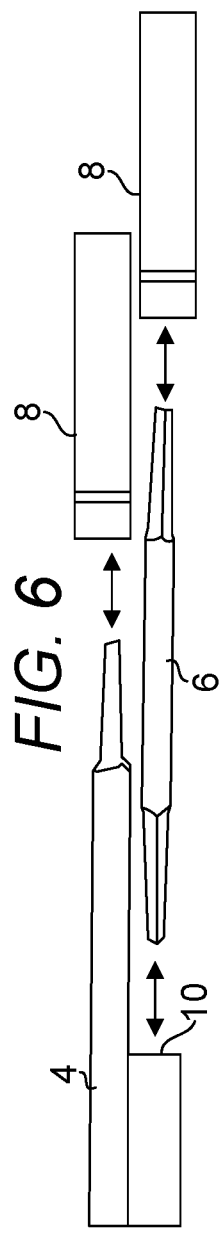
FIG. 6 is a diagram of a present display support device, depicting the device being collapsed to form a compact package for ease of transport.
Figure 7:
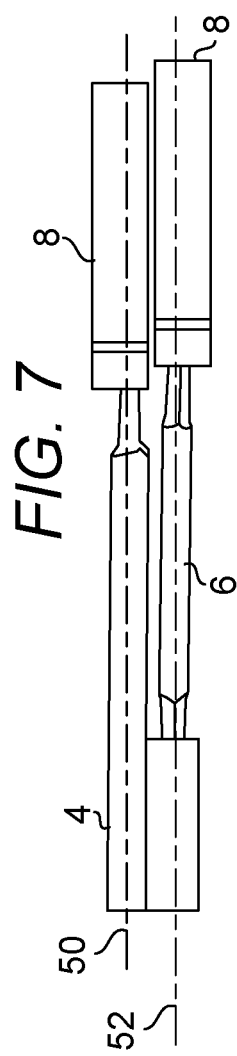
FIG. 7 is a diagram of a present display support device, depicting the device having been collapsed to form a compact package for ease of transport.

FIG. 3 is a top rear view of a present display support device 2, depicting the device being collapsed to form a compact package for ease of transport. FIG. 4 is a top view of a present display support device 2, depicting the device being assembled for use to support a turkey tail to simulate a full strut. FIG. 5 is a top view of a present display support device, depicting the device having been assembled for use to support a turkey tail to simulate a full strut. FIG. 6 is a diagram of a present display support device, depicting the device being collapsed to form a compact package for ease of transport. FIG. 7 is a diagram of a present display support device, depicting the device having been collapsed to form a compact package for ease of transport. The first elongated member 4 includes a first end 14, a second end 16 and a central axis. The second elongated member 6 includes a first end 18, a second end 20 and a central axis. There is further provided a stowage receptacle 10 disposed at the second end of the first elongated member 4, the stowage receptacle 10 including a central axis 52, wherein the central axis of the stowage receptacle is substantially parallel to the central axis 50 of the first elongated member 4. The stowage receptacle 10 is configured to be directed in a direction from the second end of the first elongated member 4 to the first end of the first elongated member 4. In the embodiment shown in FIGS. 1-7, the stowage receptacle 10 of the first elongated member 4 is substantially coaxially disposed with the first elongated member 4 to ensure that upon being removably secured at the stowage receptacle 10, the second elongated member 6 is substantially parallel with the first elongated member 4, thereby producing an arrangement of the elongated members 4, 6 that is compact. In one embodiment, a removable engagement disclosed herein is achieved by means of friction. A receptacle can either be a through hole or a blind hole. In one embodiment, the length 38 of the display support device is about 8 to about 12 inches while disposed in an in-use or ready condition. In one embodiment, the length 40 of the present display support device 2 is about 6 to about 8 inches while collapsed. In one embodiment, the width 42 of the display support device 2 is about 2 to about 4 inches while disposed in an in-use or ready condition. In one embodiment, the width 44 of the display support device 2 is about 1 to about 2 inches while collapsed.

There is provided an assembly receptacle 12 disposed at the second end of the first elongated member 4. The assembly receptacle 12 includes a central axis 50, wherein the central axis 52 of the stowage receptacle 10 is substantially parallel to the central axis of the first elongated member 4, i.e., an axis coaxially disposed with the assembly receptacle 12. The assembly receptacle 12 is configured to be directed from the first end of the first elongated member 4 and the second end of the first elongated member 4. Each clamp 8 includes an assembly receptacle 12 and a stowage receptacle 10. In order to erect or assemble the present display support device, the first end of the first elongated member is removably attached to a first of the pair of clamps 8 at the assembly receptacle of the first clamp 8. In one embodiment, a clamp 8 is secured at substantially right angle to its corresponding elongated member. The first end of the second elongated member is removably attached to a second of the pair of clamps 8 at the assembly receptacle of the second clamp 8. The first clamp 8 is configured to secure the first quill 24 of the turkey tail while the second clamp 8 is configured to secure the eighteenth quill 24. The second end of the second elongated member 6 is removably attached to the assembly receptacle of the first elongated member 4. With the first quill 24 secured with the first clamp 8 and the eighteenth quill 24 secured with the second clamp 8, the pair of clamps 8 together support the display of the turkey tail, relieving the hunter who desires his or her photographs to be taken with the prize of a hunt from having to hold the turkey tail for display with his or her hand.

Figure 9:
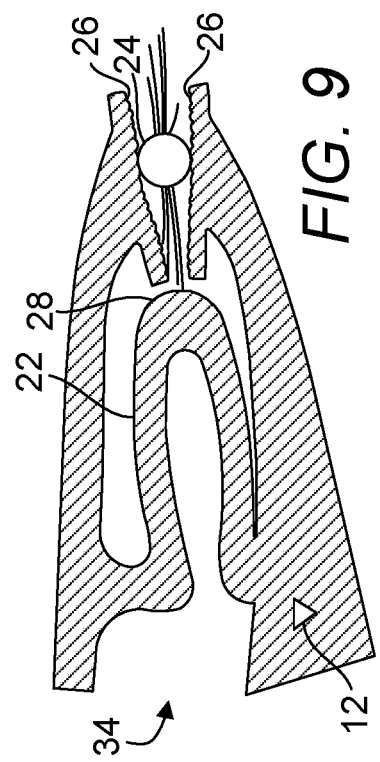
FIG. 9 is a side view of a present clamp, depicting the present clamp disposed in its in use condition.
Figure 8:
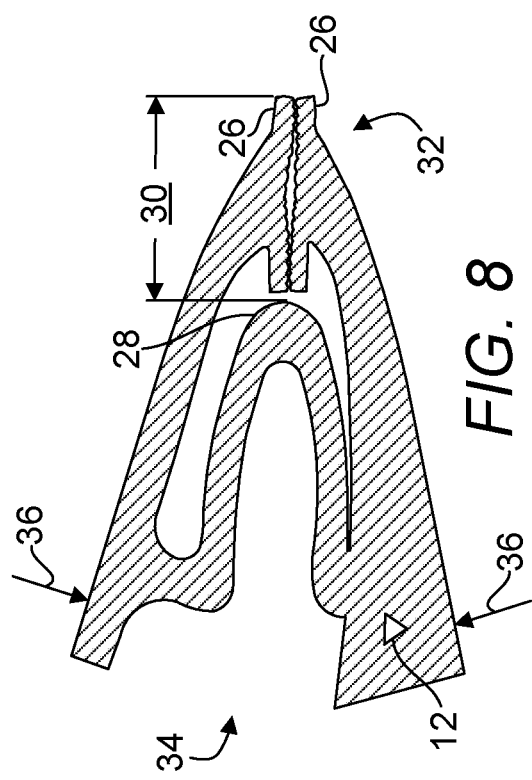
FIG. 8 is a side view of a present clamp, depicting the present clamp disposed in its at rest condition.

FIG. 8 is a side view of a present clamp 8, depicting the present clamp 8 disposed in its at rest condition. FIG. 9 is a side view of a present clamp 8, depicting the present clamp 8 disposed in its in use condition. While not in use, the jaws 26 of a clamp 8 are closed. When forces are applied in directions 36 indicated, e.g., by hand at the second end 34 of the clamp 34, the forces exerted by the spring element 22 is overcome, allowing the jaws 26 disposed at the first end 32 of the clamp 8 to be separated as shown in FIG. 9 such that the clamp 8 can be secured to a quill 24. The jaws 26 are configured sufficiently deep such that the jaws 26 can accommodate a feather within its depth 30, e.g., about 0.5 inch to about 1.5 inches, while limited by a clamp opening limiter 28 to ensure that the feather is properly disposed between the jaws 26.

Figure 10:
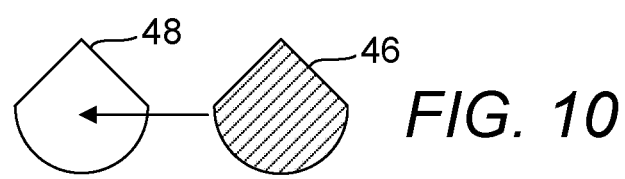
FIG. 10 is a diagram depicting one embodiment of the cross-sectional profile of an engaging end of a present elongated member and the cross-sectional profile of its matching receptacle.
Figure 11:
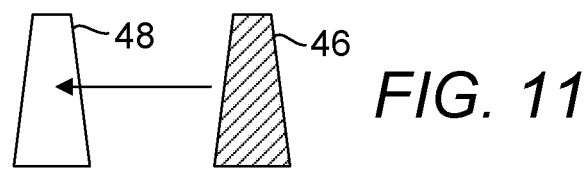
FIG. 11 is a diagram depicting another embodiment of the cross-sectional profile of an engaging end of a present elongated member and the cross-sectional profile of its matching receptacle.
Figure 12:
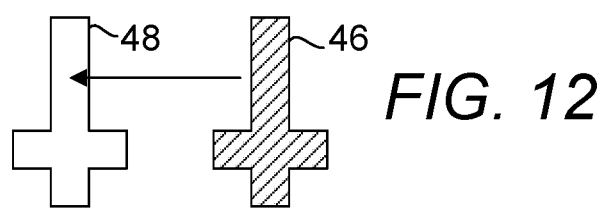
FIG. 12 is a diagram depicting yet another embodiment of the cross-sectional profile of an engaging end of a present elongated member and the cross-sectional profile of its matching receptacle.

FIG. 10 is a diagram depicting one embodiment of the cross-sectional profile of an engaging end of a present elongated member and the cross-sectional profile of its matching receptacle. FIG. 11 is a diagram depicting another embodiment of the cross-sectional profile of an engaging end of a present elongated member and the cross-sectional profile of its matching receptacle. FIG. 12 is a diagram depicting yet another embodiment of the cross-sectional profile of an engaging end of a present elongated member and the cross-sectional profile of its matching receptacle. While the ends of the elongated members may be constructed in a regular shape, e.g., triangle, hexagon, etc., as shown elsewhere herein, a user may desire a peg-receptacle coupling that is definitive to remove any guesswork when inserting an end of an elongated member into a receptacle. It shall be noted that each of the engaging ends disclosed in FIGS. 10-12, the peg has a cross-sectional profile that is unique as the peg 46 must be orientated in a certain manner so that it can be inserted in the unique matching receptacle 48. With a unique peg-matching receptacle combination, any guesswork in inserting one end of an elongated member or a peg into a receptacle is removed, increasing the confidence of a user in assembling or in dismantling the present display support device that the work has been performed correctly.

Figure 13:
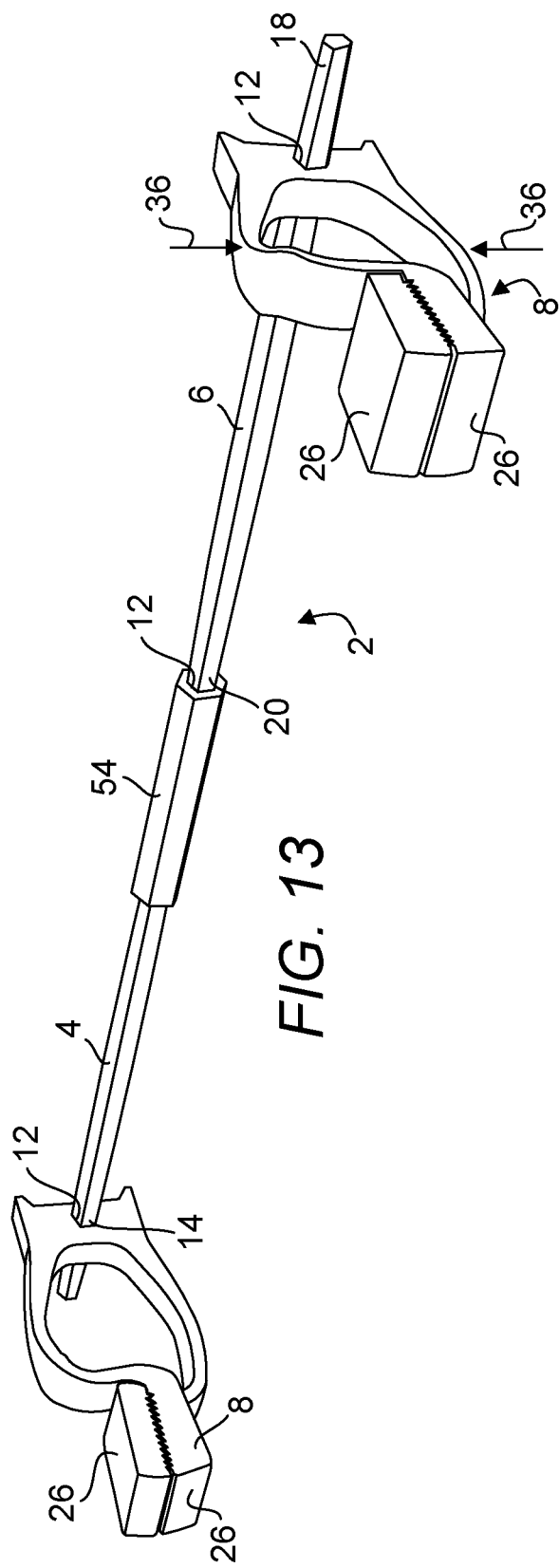
FIG. 13 is a top front view of another embodiment of a present display support device, depicting the device having been assembled for use to support a turkey tail to simulate a full strut.
Figure 14:
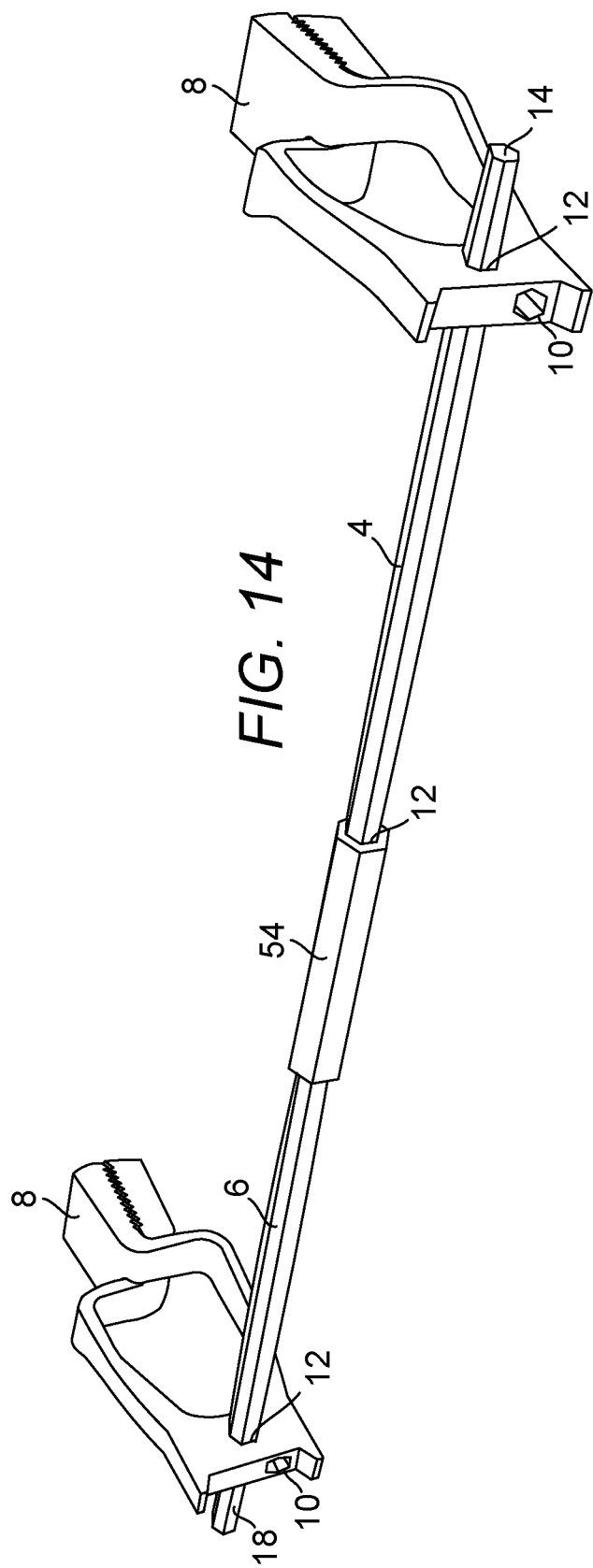
FIG. 14 is a top rear view of the embodiment of the present display support device shown in FIG. 13, depicting the device having been assembled for use to support a turkey tail to simulate a full strut.

FIG. 13 is a top front view of another embodiment of a present display support device, depicting the device having been assembled for use to support a turkey tail to simulate a full strut. FIG. 14 is a top rear view of the embodiment of the present display support device shown in FIG. 13, depicting the device having been assembled for use to support a turkey tail to simulate a full strut. Again, the display support device 2 essentially includes a first elongated member 4 and a second elongated member 6 each of which is configured to be removably attached to a coupler 54 and a clamp 8. The first clamp 8 is configured to secure a first portion of the turkey tail, e.g., the first quill and the second clamp 8 is configured to secure a second portion of the turkey tail, e.g., the eighteenth quill. The first clamp 8 and the second clamp 8 cooperate to support the display of the turkey tail. It shall be noted that, in this embodiment, the first elongated member 4 and the second elongated member 6 are held together with a coupler 54. To collapse the assembly for stowage, one of the elongated members 4, 6 may be left attached to the coupler 54 to ensure that the coupler 54 is not inadvertently separated and left behind. Similar to the manner in which clamps 8 are stowed as shown in FIG. 3, the clamps 8 shown herein may be stowed away to form a compact sub-assembly of elongated member-clamp by coupling an elongated member to a clamp at receptacle 10 or a coupler-elongated member-clamp sub-assembly by coupling an elongated member to a clamp at receptacle 10 at one end and by coupling the elongated member to the coupler 54 at the other end. A receptacle 10 need not be disposed on one end of a clamp as shown. Further, an assembly receptacle 12 may alternatively be used to secure a clamp 8 in a stowed configuration of the display support device. In other words, the clamps 8 may be left attached the elongated members 4, 6. When forces are applied in directions 36 indicated, e.g., by hand at the spring-loaded arms 56 of the jaws 26 of the clamp 8, the resistance exerted by the arms 56 is overcome, allowing the jaws 26 to be spread such that the clamp 8 can be secured to a quill. Teeth are preferably built into the jaws 26 to enhance the grip of the jaws 26. Again, the jaws 26 are configured sufficiently deep such that the jaws 26 can accommodate a feather within its depth to ensure that the feather is properly disposed between the jaws.

FIG. 15 is a top rear view of yet another embodiment of the present display support device, depicting the device having been assembled for use to support a turkey tail to simulate a full strut. Here, the coupler 54 now includes a stowage receptacle 10 disposed similarly to the stowage receptacle 10 shown in FIG. 5 although the coupler 54 here is a discrete piece from the first elongated member 4. It is also conceivable that the coupler 54 shown herein to be constructed as a single unit with the first elongated member 4, much like the configuration disclosed in FIGS. 1-7.

In one embodiment, the device is constructed, e.g., by means of three-dimensional (3D) printing, from a polymeric material or another material that is resilient, durable, lightweight, compact and would not interfere with other field equipment of a hunter while being carried in a location that is easy to reach, e.g., a hunter's pocket. The compactness of the device in its stowed state also encourages the hunter to carry the device around and be available while hunting.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A display support device for supporting a display of an object, said display support device comprising:
    (a) a first elongated member;
    (b) a second elongated member configured to be removably attached to said first elongated member; and
    (c) a pair of clamps, a first of which is configured to be removably attached to said first elongated member and a second of which is configured to be removably attached said second elongated member,
    wherein said first clamp is configured to secure a first portion of said object, said second clamp is configured to secure a second portion of said object, said removable attachment between said second elongated member and said first elongated member is a unique peg-unique receptacle attachment and said first clamp and said second clamp cooperate to support the display of the object.

2. The display support device of claim 1, wherein said second elongated member is configured to be removably attached to said first elongated member for stowage.

3. The display support device of claim 1, wherein at least a clamp of said pair of clamps further comprises a stowage receptacle, wherein said stowage receptacle is configured to receive one end of one of said first elongated member and said second elongated member.

4. The display support device of claim 1, wherein at least one of said removable attachment between one of said clamps and one of said first elongated member and said removable attachment between the other one of said clamps and said second elongated member is a unique peg-unique receptacle attachment.

5. The display support device of claim 1, wherein at least one of said first clamp and said second clamp is a spring clamp.

6. The display support device of claim 1, wherein the object is a turkey tail.

7. A display support device for supporting a display of an object, said display support device comprising:
    (a) a first elongated member comprising a first end and a second end;
    (b) a second elongated member comprising a first end and a second end;
    (c) an assembly receptacle disposed at said second end of said first elongated member, wherein said assembly receptacle of said display support device is configured to be directed from said first end of said first elongated member to said second end of said first elongated member; and
    (d) a pair of clamps, each said clamp comprises an assembly receptacle;
    wherein, said first end of said first elongated member is configured to be removably attached to a first of said pair of clamps at said assembly receptacle of said first clamp, said first end of said second elongated member is configured to be removably attached to a second of said pair of clamps at said assembly receptacle of said second clamp, said first clamp configured to secure a first portion of said object, said second clamp configured to secure a second portion of said object, said second end of said second elongated member is configured to be removably attached to said assembly receptacle of said display support device, said first end of said first elongated member comprises a unique peg and said assembly receptacle of at least one of said first clamp and said second clamp comprises a unique receptacle configured to receive said unique peg of said first end of said first elongated member and said first clamp and said second clamp cooperate to support the display of the object.

8. The display support device of claim 7, further comprising a stowage receptacle disposed at said second end of said first elongated member, said stowage receptacle comprising a central axis, wherein each said clamp further comprises a stowage receptacle, said first elongated member further comprises a central axis, said second elongated member further comprises a central axis, said assembly receptacle of said display support device further comprises a central axis, said central axis of said stowage receptacle of said first elongated member is substantially parallel to said central axis of said first elongated member, said second elongated member is configured to be removably attached at said second end of said second elongated member to said stowage receptacle of said first elongated member, said first elongated member is configured to be removably attached at said first end of said first elongated member to said stowage receptacle of one of said first clamp and said second clamp and said second elongated member is configured to be removably attached to said stowage receptacle of the other one of said first clamp and said second clamp for stowage.

9. The display support device of claim 8, wherein said central axis of said assembly receptacle of said display support device is substantially coaxially disposed with said central axis of said first elongated member.

10. The display support device of claim 7, wherein at least one of said first end and said second end of said second elongated member comprises a unique peg and said assembly receptacle of at least one of said first clamp and said second clamp comprises a unique receptacle configured to receive said unique peg of said at least one of said first end and said second end of said second elongated member.

11. The display support device of claim 7, wherein at least one of said first clamp and said second clamp is a spring clamp.

12. The display support device of claim 7, wherein the object is a turkey tail.

13. A display support device for supporting a display of an object, said display support device comprising:
 (a) a first elongated member comprising a first end, a second end and a central axis;
 (b) a second elongated member comprising a first end, a second end and a central axis;
 (c) a stowage receptacle disposed at said second end of said first elongated member, said stowage receptacle of said display support device comprising a central axis, wherein said central axis of said stowage receptacle of said first elongated member is substantially parallel to said central axis of said first elongated member;
 (d) an assembly receptacle disposed at said second end of said first elongated member, said assembly receptacle of said display support device comprising a central axis; and
 (e) a pair of clamps, each said clamp comprises an assembly receptacle and a stowage receptacle,
 wherein,
 in a first state, said first end of said first elongated member is configured to be removably attached to a first of said pair of clamps at said assembly receptacle of said first clamp, said first end of said second elongated member is configured to be removably attached to a second of said pair of clamps at said assembly receptacle of said second clamp, said first clamp configured to secure a first portion of said object, said second clamp configured to secure a second portion of said object, said second end of said second elongated member is configured to be removably attached to said assembly receptacle of said display support device, said first clamp and said second clamp cooperate to support the display of the object; and
 in a second state, said second elongated member is configured to be removably attached at said second end of said second elongated member to said stowage receptacle of said display support device, said first elongated member is configured to be removably attached at said first end of said first elongated member to said stowage receptacle of one of said first clamp and said second clamp and said second elongated member is configured to be removably attached to said stowage receptacle of the other one of said first clamp and said second clamp for stowage.

14. The display support device of claim 13, wherein said first end of said first elongated member comprises a unique peg and said assembly receptacle of at least one of said first clamp and said second clamp comprises a unique receptacle configured to receive said unique peg of said first end of said first elongated member.

15. The display support device of claim 13, wherein at least one of said first end and said second end of said second elongated member comprises a unique peg and said assembly receptacle of at least one of said first clamp and said second clamp comprises a unique receptacle configured to receive said unique peg of said at least one of said first end and said second end of said second elongated member.

16. The display support device of claim 13, wherein said central axis of said assembly receptacle of said display support device is substantially coaxially disposed with said central axis of said first elongated member.

17. The display support device of claim 13, wherein at least one of said first clamp and said second clamp is a spring clamp.

18. The display support device of claim 13, wherein the object is a turkey tail.

\* \* \* \* \*